United States Patent
Yamamoto

(10) Patent No.: US 8,063,591 B2
(45) Date of Patent: Nov. 22, 2011

(54) MOTOR DRIVING DEVICE AND METHOD FOR MAKING JUDGMENT ON STATE OF MOTOR DRIVING DEVICE

(75) Inventor: Tokushi Yamamoto, Churyu (JP)

(73) Assignee: DENSO CORPORATION, Kariya (JP)

( * ) Notice: Subject to any disclaimer, the term of this patent is extended or adjusted under 35 U.S.C. 154(b) by 385 days.

(21) Appl. No.: 12/453,458

(22) Filed: May 12, 2009

(65) Prior Publication Data

US 2009/0284205 A1    Nov. 19, 2009

(30) Foreign Application Priority Data

May 13, 2008 (JP) ................................ 2008-125953

(51) Int. Cl.
*H02P 1/04* (2006.01)
*H02P 7/00* (2006.01)
(52) U.S. Cl. ........ 318/280; 318/281; 318/282; 318/283; 318/285; 318/490
(58) Field of Classification Search ................... 318/280, 318/281–283, 285, 490
See application file for complete search history.

(56) References Cited

U.S. PATENT DOCUMENTS

| | | | | |
|---|---|---|---|---|
| 6,922,623 B2* | 7/2005 | Rieger et al. | .................... | 701/67 |
| 6,976,708 B2 | 12/2005 | Aoki et al. | | |
| 2003/0226704 A1* | 12/2003 | Aoki et al. | .................... | 180/271 |
| 2005/0077412 A1* | 4/2005 | Tanaka et al. | .............. | 242/390.9 |
| 2006/0237570 A1* | 10/2006 | Takao et al. | .................. | 242/374 |
| 2006/0261589 A1 | 11/2006 | Tanaka | | |
| 2008/0059022 A1* | 3/2008 | Shimodaira et al. | ............ | 701/36 |
| 2009/0048739 A1* | 2/2009 | Midorikawa | .................... | 701/45 |

FOREIGN PATENT DOCUMENTS

| | | |
|---|---|---|
| JP | H11-314573 | 11/1999 |
| JP | 2004-009839 | 1/2004 |
| JP | A-2005-028932 | 2/2005 |
| JP | 2005-271769 | 10/2005 |
| JP | 2005-297731 | 10/2005 |
| JP | A-2005-271730 | 10/2005 |
| JP | A-2006-321358 | 11/2006 |

OTHER PUBLICATIONS

Notification of Reasons for Rejection dated Dec. 15, 2009 from the Japan Patent Office Action for the corresponding patent application No. 2008-125953(and English Translation).

* cited by examiner

*Primary Examiner* — Thomas Dougherty
(74) *Attorney, Agent, or Firm* — Posz Law Group, PLC

(57) ABSTRACT

The motor driving device includes a first function of supplying power to a motor so that the motor generates a driving force to drive a driven member, a second function of detecting a current flowing through the motor, a third function of performing a power supply control in order that a value of the current detected by the second function is maintained within a target range, a fourth function of performing a power supply operation in which the motor is supplied with power for a predetermined time period which is short enough to avoid the driven member from being driven by the motor, before the third function performs the power supply control, and a fifth function of making a judgment on a state of each of the first to third functions on the basis of the value of the current detected by the second function during the predetermined time period.

5 Claims, 5 Drawing Sheets

MOTOR DRIVING DEVICE AND METHOD FOR MAKING JUDGMENT ON STATE OF MOTOR DRIVING DEVICE

CROSS-REFERENCE TO RELATED APPLICATION

This application is related to Japanese Patent Application No. 2008-125953 filed on May 13, 2008, the contents of which are hereby incorporated by reference.

BACKGROUND OF THE INVENTION

1. Field of the Invention

The present invention relates to a motor driving device for controlling a driving state of a motor used in a fail-safe designed system, and to a method of judging a state of the motor driving device.

2. Description of Related Art

It is known to design a system in fail-safe structure so that the system always operates on the safe side when there occurs any fault in the components constituting the system. As such a system (may be referred to as "fatal system" hereinafter), there are a pre-crash safety system, and an electric power steering system, for example.

Each of the pre-crash safety system and the electric power steering system includes a motor to drive a certain member, and a motor driving device which controls a driving state of the motor. Generally, the motor driving device includes a driver circuit to supply power to the motor, a current detecting circuit to detect a value of a current flowing through the motor, an over-current detecting circuit to detect an over-current in the motor and output a stop signal when an over-current is detected, and a microcomputer to control the driver circuit in accordance with output signals from the current detecting circuit and the over-current detecting circuit.

Such a motor driving device, which is required to have high reliability because it is used in a fatal system, is configured to perform a state inspection to make a judgment whether or not there is any fault therein when it starts to operate. It is desirable that the state inspection is performed while the motor is actually driving a driven member in terms of accuracy of the state inspection. However, in this case, since the driven member moves at a timing which is not anticipated by the user of the system, the user may have a feeling of concern.

Accordingly, there has been developed a motor driving device which includes an additional circuit (or additional signal path) for enabling the microcomputer thereof to apply false signals to the driver circuit and the over-current detecting circuit thereof in order to bring them in the same state as the starting state of the motor without actually driving the motor. In this motor driving device provided with the additional circuit, each of its components such as the driver circuit and the current detecting circuit is subjected to the state inspection individually one by one. For more details, refer to Japanese Patent Application Laid-open No. 11-314573, for example.

However, this motor driving device has problems in that its manufacturing cost and size are large because of the provision of the additional circuit, and that even when there occurs a fault only in the additional circuit, it is judged that there is a fault in at least one of the components of the motor driving device.

SUMMARY OF THE INVENTION

The present invention provides a motor driving device for controlling a driving state of a motor of a driven device having a driven member and a clutch, the clutch including a first member configured to move when applied with a driving force in a first direction or a second direction opposite to the first direction generated by the motor, a second member which transmits the driving force to the driven member while the first member engages with the second member, the clutch being configured such that a first time period elapses from a time at which the driving force in the first direction is applied to the first member located at an initial position thereof to a time at which the first member engages with the second member, the motor driving device comprising:

a first function of supplying power to the motor so that the motor generates the driving force;

a second function of detecting a current flowing through the motor supplied with power by the first function;

a third function of performing a power supply control in order that a value of the current detected by the second function is maintained within a target range;

a fourth function of performing a first power supply operation in which the motor is supplied with power for a second time period shorter than the first time period such that the motor generates the driving force in the first direction before the third function performs the power supply control; and a fifth function of making a judgment on a state of each of the first to third functions on the basis of the value of the current detected by the second function during the second time period.

According to the present invention, there is provided a motor driving device for a fail-safe designed system capable of performing self-inspection without requiring any additional circuit, and without giving the user of the system a feeling of concern.

Other advantages and features of the invention will become apparent from the following description including the drawings and claims.

PREFERRED EMBODIMENTS OF THE INVENTION

Figure 1:
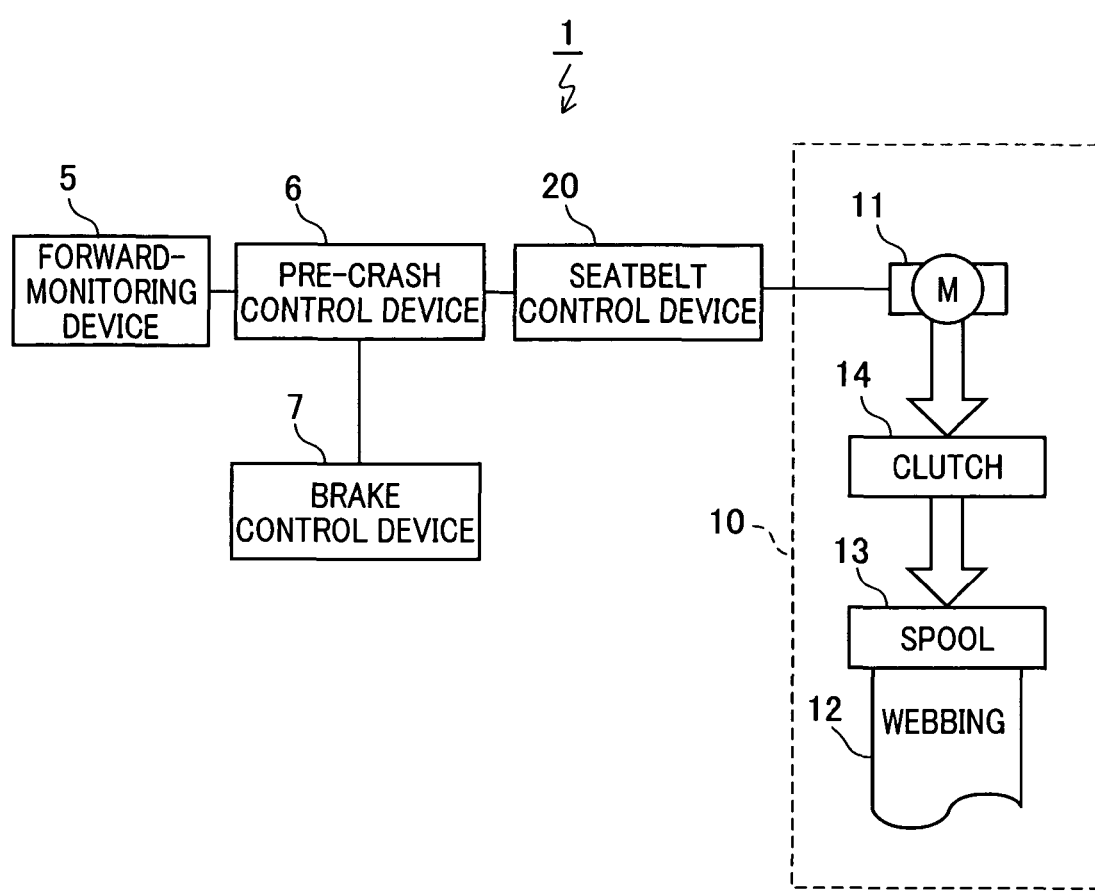
FIG. 1 is a block diagram showing a schematic structure of a pre-crash safety system including a vehicle-mounted seatbelt control apparatus as a motor driving device according to a first embodiment of the invention.

FIG. 1 is a block diagram schematically showing a structure of a pre-crash safety system 1 including a vehicle-mounted seatbelt control device as a motor driving device according to an embodiment of the invention. In the following, a vehicle on which the pre-crash safety system 1 is mounted is referred to as an "own-vehicle".

The pre-crash safety system 1 operates to increase the braking force of the own vehicle or the fastening force of a seatbelt when there is high possibility of collision between the own vehicle and an obstacle present on a travel road of the own vehicle.

To this end, as shown in FIG. 1, the pre-crash safety system 1 includes a forward-monitoring device 5 to monitor the travel road of the own vehicle, a brake control device 7 to control the brake mechanism of the own vehicle, at least one seatbelt winding device 10 to wind each of the seatbelts provided in the own vehicle, a pre-crash control device (may be referred to as "pre-crash ECU" hereinafter) 6 which determines whether or not a collision probability is higher than a predetermined threshold on the basis of the output of the forward-monitoring device 5 and controls the brake control device 7 in accordance with the determination result, and a seatbelt control device (may be referred to as "seatbelt control ECU" hereinafter) 20 which increases the fastening force of the seatbelt when the collision probability is detected to be higher than the threshold.

The forward-monitoring device 5 is mainly constituted by a milliwave radar device which detects a target such as a succeeding vehicle by transmitting and receiving a radar wave, acquires target data including the position and speed of the detected target with respect to the own vehicle, and outputs the acquired target data to the pre-crash ECU 6. Alternatively, the forward-monitoring device 5 may be mainly constituted by a vehicle-mounted camera which is located to take pictures of the forward road image of the own vehicle and acquires target data on the basis of the taken image, or a laser radar device which acquires target data by transmitting and receiving a laser beam, or a combination of the milliwave radar device, the vehicle-mounted camera and the laser radar device.

The pre-crash ECU 6 is mainly constituted by a microcomputer including a CPU, ROM, RAM, and a bus connecting these components. The pre-crash ECU 6 calculates a collision probability on the basis of the target data received from the forward-monitoring device 5, and makes an indication of the calculated collision probability in the own vehicle. Also, the pre-crash ECU 6 checks whether or not the calculated collision probability is higher than a predetermined first threshold, and if the check result is affirmative, causes the brake control device 7 to operate to increase the braking force of the own vehicle. Furthermore, the pre-crash ECU 6 checks whether or not the calculated collision probability is higher than a predetermined second threshold, and if the check result is affirmative, outputs a start command to the seat belt control device 20 to command the control device 20 to start control of the fastening force of the seat belts. Next, the seatbelt winding device 10 is explained.

Each of the seatbelt winding devices 10, which is one of the components of a seatbelt mechanism of the own vehicle for restraining a passenger (including a driver) to a seat, is for enabling winding and unwinding of a webbing 12 of the seatbelt.

The seatbelt winding device 10 includes a spool 13 to which one end of the webbing 12 is fixed, a motor 13 for generating a driving force to drive the spool 13, a gear group (not shown) and a clutch 14 for transmitting the driving force generated by the motor 13 to the spool 13, and a holding member (not shown) which rotatably holds the spool 13 and support the motor 11, gear group and the clutch 14 so that the seatbelt winding device 10 is fixed to the body of the own vehicle.

The motor 11, which converts electric energy into rotational movement (kinetic energy), generates the driving force in the direction depending on a current supply direction to the motor 11. The clutch 14 includes a first member (not shown) fixed on the driving side thereof which receives the driving force generated by the motor 11, and a second member (not shown) fixed on the driven side thereof which transmits the driving force received by the first member to the spool 13. The clutch 14 is configured such that when the driving force in a predetermined direction (normal direction) is applied to the first member, the first member turns from an initial position (disengaging position) to engage with the second member, and when the driving force in the other direction (reverse direction) is applied to the first member, the first member returns to the initial position to disengage from the second member.

As explained above, there is some play between a time at which the driving force in the normal direction is applied to the first member and a time at which the first member engages with the second member. That is, a predetermined time has to be elapsed before the spool 13 starts to rotate after the driving force in the normal direction is applied to the first member.

Hence, when the motor 11 generates the driving force in the normal direction, the first and second members engage to each other (that is, the clutch 14 is engaged) after an elapse of the predetermined time after the first member starts turning from the initial position. When the first and second members engage to each other, the spool 13 rotatably held by the holding member rotates in a direction corresponding to the normal direction to wind the webbing 12 thereonto.

On the other hand, when the motor 11 generates the driving force in the reverse direction, the first member returns to the initial position to disengage from the second member, at which the play becomes its maximum. Next, the seatbelt control device (seatbelt ECU) 20 is explained.

Figure 2:
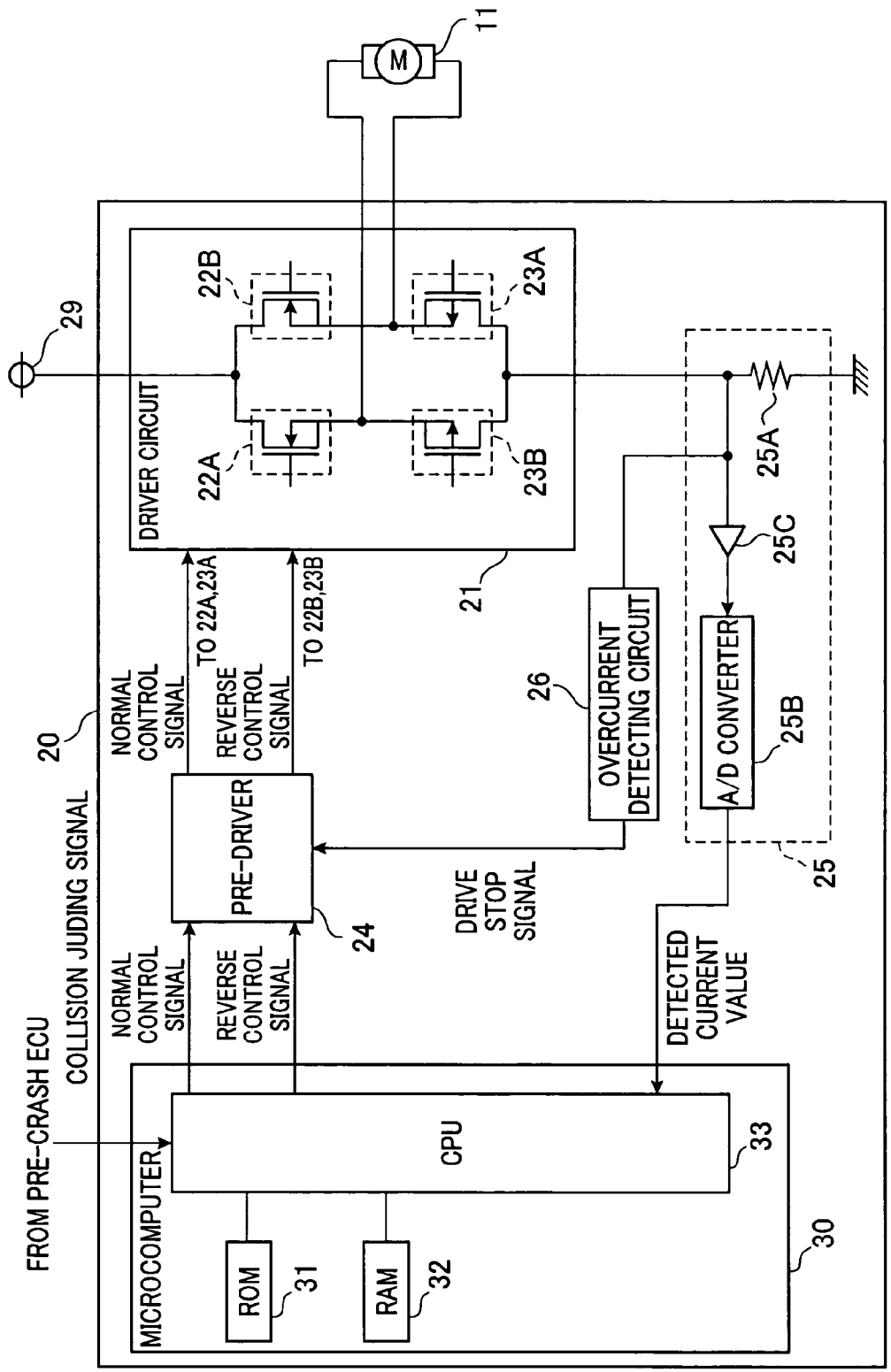
FIG. 2 is a block diagram showing the structure of the seatbelt control apparatus.

FIG. 2 is a block diagram showing a structure of the seatbelt ECU 20. As shown in FIG. 2, the seatbelt ECU 20 includes a driver circuit 21 for turning on/off power supply to the motor 11, a current detecting circuit 25 which includes a shunt resistor 25A for detecting a value of a current flowing through the motor 11 (may be referred to as "detected current value" hereinafter), an amplifier 25C for amplifying the detected current value and an A/D converter 25B for A/D converting the amplified current value, an over-current detecting circuit 26 for detecting an over-current in the motor 11, and generating a drive stop signal upon detecting an over-current, and a microcomputer 30 which generates and outputs a motor control signal for controlling the motor 11 through the driver circuit 21 in accordance with the output of the current detecting circuit 25.

In this embodiment, when the motor control signal is at the high level, power supply to the motor 11 is allowed, and when the motor control signal is at the low level, power supply to the motor 11 is inhibited. The current flowing through the motor 11, that is, the torque generated by the motor 11 can be adjusted by controlling the duty ratio (the ratio of a high level time period to a low level time period) of the motor control signal.

The driver circuit 21 is an H-bridge circuit constituted by four N-channel FETs. Of the four N-channel FETs, two FETs 22A and 22B are connected to the microcomputer 30 at their gates, connected to a battery 29 at their drains, and connected to the motor 11 at their sources. The other two FETs 23A and 23B are connected to the microcomputer 30 at their gates, connected to the motor 11 at their drains, and grounded at their sources.

Accordingly, when the motor control signal which the microcomputer 30 applies to the FETs 22 and 23 are at the high level, the FETs 22 and 23 are at the on-state, while the motor control signal is at the low level, the FETs 22 and 23 are at the off-state. In this embodiment, the driver circuit 21 and the motor 11 are connected to each other such that when the FETs 22A and 23A are turned on, the motor 11 generates the driving force in the normal direction, and when the FETs 22B and 23B are turned on, the motor 11 generates the driving force in the reverse direction.

That is, the driver circuit 21 is capable of switching the driving direction of the motor 11 by rendering two of the four FETs 22 and 23 conductive between drain and source. In the following, the FET 22A and FET 23A are respectively referred to as "normal FET 22A" and "normal FET 23A", and the FET 22B and FET 23B are respectively referred to as "reverse FET22B" and "reverse FET23B". Also, the motor control signal applied to the normal FETs 22A and 23A to cause the motor 11 to generate the driving force in the normal direction may be referred to as "normal control signal", and the motor control signal applied to the reverse FETs 22B and 23B to cause the motor 11 to generate the driving force in the reverse direction may be referred to as "reverse control signal" hereinafter.

Since the FET 22A and FET 22B are N-channel FETs, it is necessary to apply a voltage higher than the voltage of the battery 29 to the FET 22A and FET 22B to definitely turn on the FET 22A and FET 22B. Accordingly, the motor control signal outputted from the microcomputer 30 is inputted to the driver circuit 21 through a pre-driver circuit 24 which raises the voltage of the motor control signal at the high level to a predetermined voltage.

The pre-driver circuit 24 is configured to generate the predetermined voltage by a step-up circuit thereof (not shown), and stop outputting the motor control signal (normal or reverse control signal) upon receiving the drive stop signal from the over-current detecting circuit 26.

The microcomputer 30 includes a ROM 31 for storing data or programs which should be maintained after shut down of power supply, a RAM 32 for temporarily storing data, a CPU 33 which executes the programs stored in the ROM 31, and a bus connecting these components.

The programs stored in the ROM 31 includes a process program executed by the CPU 33 for data exchange with other ECUs (ECUs other than the seatbelt ECU 20) such as the pre-crash ECU 6, and a process program executed by the CPU 33 for controlling the duty ratio (or pulse width) of the motor control signal such that the current flowing through the motor 11 becomes equal to a target value.

The ROM 31 further stores a process program executed by the CPU 33 for performing a self-diagnostic process to judge whether or not there is a fault in the components constituting the seatbelt ECU 20.

Figure 3:
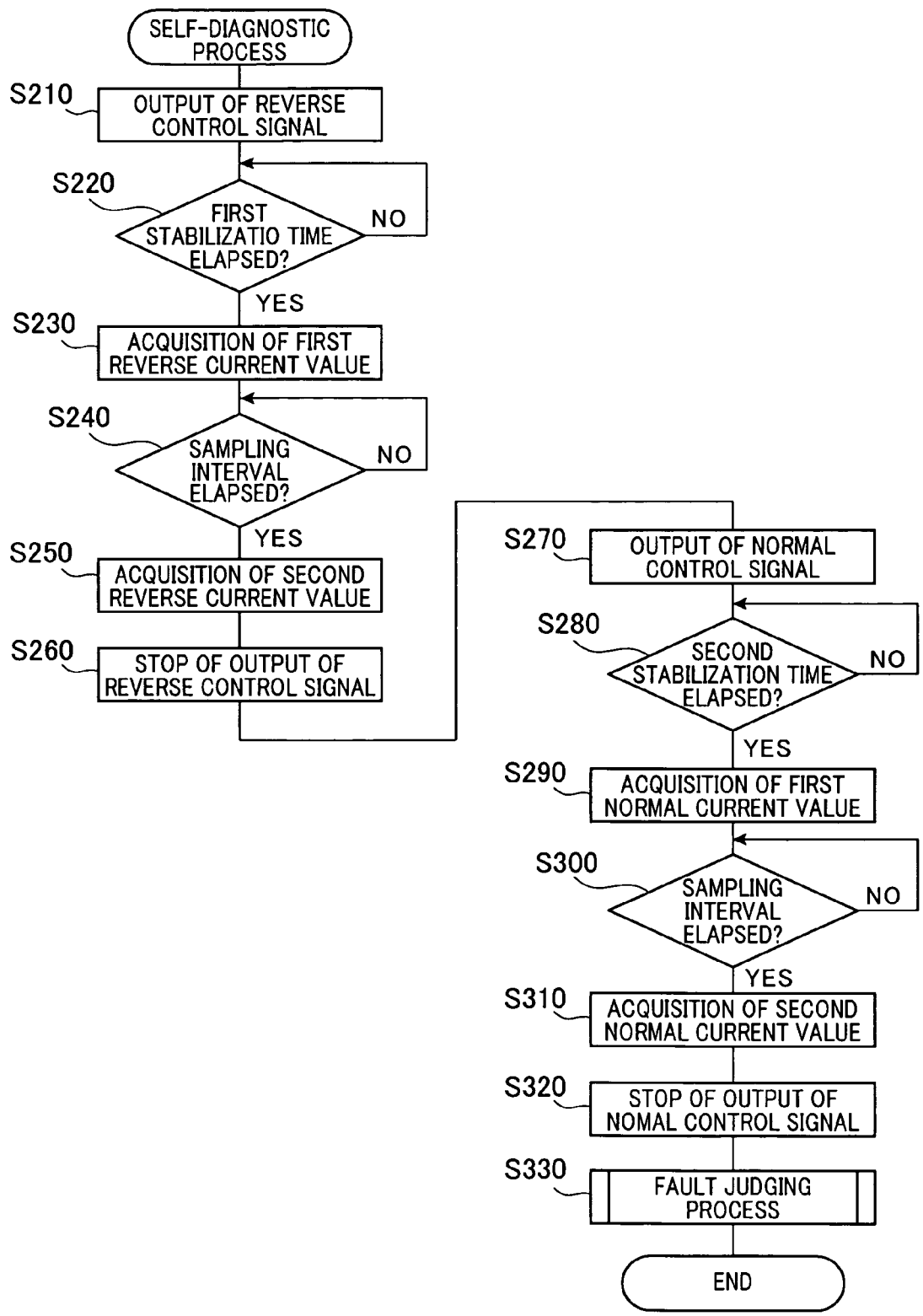
FIG. 3 is a flowchart showing a self-diagnostic process performed by the seatbelt control apparatus.

As explained above, the seatbelt ECU 20 is constituted as a motor drive apparatus controlling the driving state of the motor 11. Next, the self-diagnostic process performed by the seatbelt ECU 20 is explained with reference of the flowchart of FIG. 3. This self-diagnostic process is activated when the seatbelt ECU 20 is activated (when the ignition switch of the own vehicle is turned on).

When the self-diagnostic process is activated, the reverse control signal having a predetermined initial duty ratio starts to be applied to the reverse FETs 22B and 23B at step S210. As a result, the motor 11 starts to generate the driving force in the reverse direction.

At subsequent step S220, it is determined whether or not a predetermined first stabilization time has elapsed since the start of the application of the reverse control signal to the reverse FETs 22B and 23B. The process waits until the determination result at step S220 becomes affirmative, and thereafter proceeds to step S230. The first stabilization time, which can be obtained by experiment, is a time needed for the motor 11 to reach a stabilized state after the start of application of the reverse control signal to the reverse FETs 22B and 23B.

At step S230, the detected current value outputted from the current detecting circuit 25 is read in, and then the process proceeds to step S240. In the following, the detected current value read in at step S230 is referred to as "the first reverse current value $I_{r1}$".

At step S240, it is determined whether or not a predetermined sampling interval has elapsed from when the first reverse current value $I_{r1}$ is read in, and accordingly, a sampling timing has come. The process waits until the determination result at step S240 becomes affirmative, and thereafter proceeds to step S250.

At step S250, the detected current value outputted from the current detecting circuit 25 is read in. Thereafter, the process proceeds to step S260. In the following, the detected current value read in at step S250 is referred to as "the second reverse current value $I_{r2}$". The sampling interval is equal to a time period from when the first reverse current value $I_{r1}$ is read in at step S230 to when the second reverse current value $I_{r2}$ is read in at step S250.

At step S260, outputting the reverse control signal to the reverse FETs 22B and 23B is stopped to thereby stop the motor 11. Subsequently, outputting the normal control signal having the initial duty ratio to the normal FETs 22A and 23A is started. As a result, the motor 11 starts to generate the driving force in the normal direction.

At subsequent step S280, it is determined whether or not a predetermined second stabilization time has elapsed from when outputting the normal control signal is started. The process waits until the determination result at step S280 becomes affirmative, and thereafter, proceeds to step S290. The second stabilization time, which can be obtained by experiment, is a time needed for the motor 11 to reach a stabilized state after the start of outputting the normal control signal.

At step S290, the detected current value outputted from the current detecting circuit 25 is read in. Thereafter, the process proceeds to step S300. In the following, the detected current value read in at step S290 is referred to as "the first normal current value $I_{n1}$".

At step S300, it is determined whether or not the predetermined sampling interval has elapsed from when the first normal current value $I_{n1}$ is read in. The process waits until the determination result at step S300 becomes affirmative, and thereafter, proceeds to step S310.

At step S310, the detected current value outputted from the current detecting circuit 25 is read in. Thereafter, the process proceeds to step S320. In the following, the detected current value read in at step S310 is referred to as "the second normal current value $I_{n2}$". The sampling interval is equal to a time period from when the first normal current value $I_{n1}$ is read in at step S290 to when the second normal current value $I_{n2}$ is read in at step S310.

At step S320, outputting the normal control signal is stopped to thereby stop the motor 11. In this embodiment, the sum of the second stabilization time and the sampling interval (referred to as "specific time" hereinafter) is set shorter than a time needed for the first member at the initial position to move and engage with the second member from when outputting the normal control signal is started to cause the motor 11 to generate the driving force in the normal direction (referred to as "given time" hereinafter). Accordingly, the time needed to complete reading of the second normal current value $I_{n2}$ from when outputting the normal control signal is started is shorter than the given time.

At step S330, a fault judging process is performed to detect the state of the seatbelt ECU 20 on the basis of the first reverse current value $I_{r1}$, the second reverse current value $I_{r2}$, the first normal current value $I_{n1}$ and the second normal current value $I_{n2}$.

Figure 4:
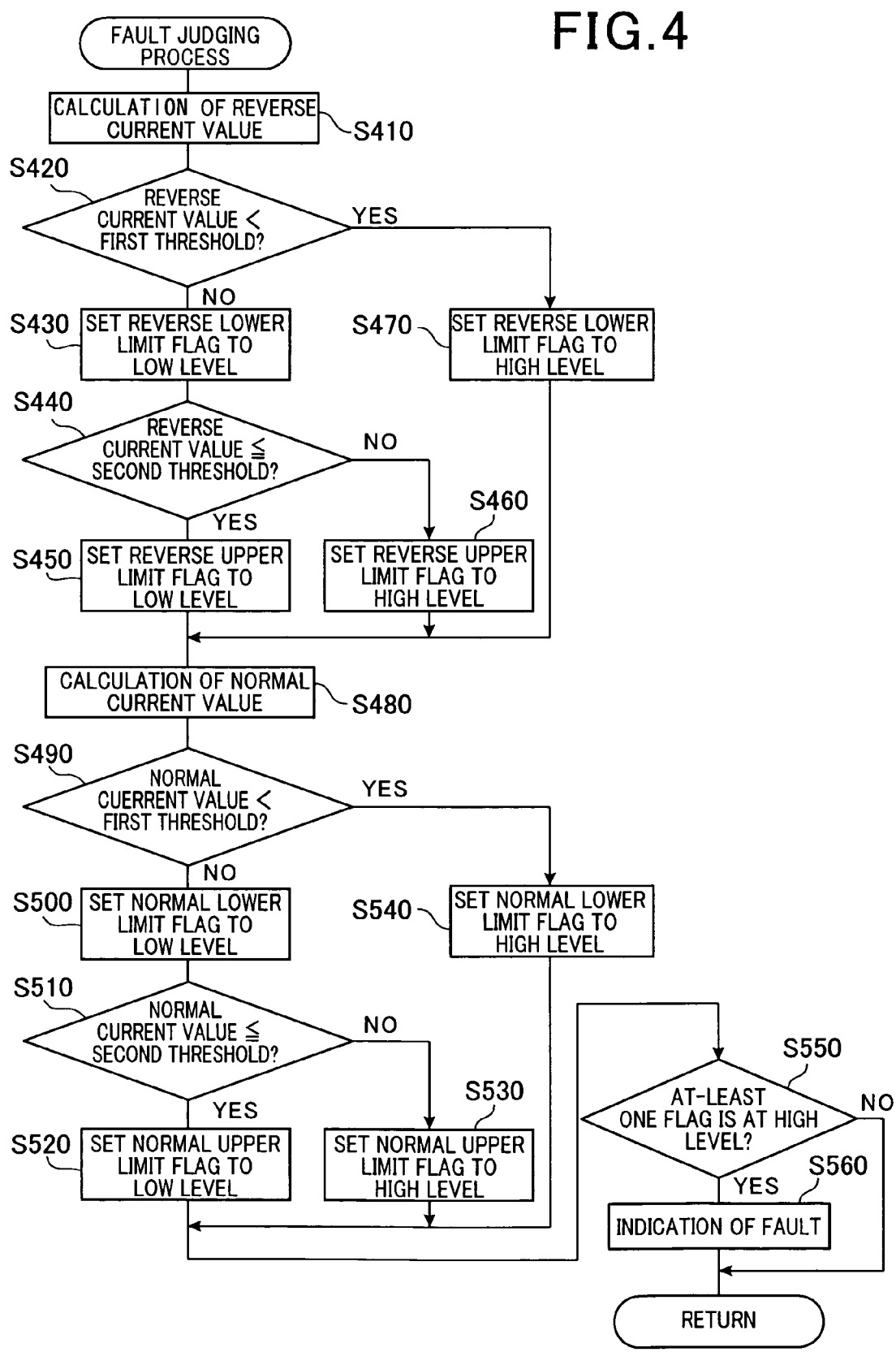
FIG. 4 is a flowchart showing a fault judging process performed by the seatbelt control apparatus.

Thereafter, the self-diagnostic process is terminated. Next, the fault judging process performed at step S330 of the self-diagnostic process is explained with reference to the flowchart of FIG. 4.

The fault judging process, which is activated at step S330 of the self-diagnostic process, begins by calculating at step S410 a reverse current value $I_r$ which is one of the parameters to judge the state of the seatbelt ECU 20. Here, the reverse current value $I_r$ is calculated as the sum of the first reverse current value $I_{r1}$ and the second reverse current value $I_{r2}$.

At subsequent step S420, it is determined whether or not the calculated reverse current value $I_r$ is smaller than a predetermined first threshold. If the determination result at step S420 is negative, the process proceeds to step S430. The first threshold, which is obtained in advance by experiment for example, has a value twice the lower limit value of the current flowing through the motor 11 when the motor control signal (reverse control signal, or the normal control signal) having the initial duty ratio is applied to the driver circuit 21.

That is, step S420 enables making a judgment whether or not at least one of the pre-driver 24, driver circuit 21 current detecting circuit 25 and CPU 33 constituting the seatbelt ECU 20 has a fault which causes the current flowing through the motor 11 generating the driving force in the reverse direction to be lower than the lower limit value. In the following, this fault may be referred to as "lower limit fault", and this judgment may be referred to as "lower limit judgment". The lower limit fault includes a fault in which at least one of the reverse FETs 22B and 23B cannot be turned on.

At step S430, a reverse lower limit flag indicative of the state of the seatbelt ECU 20 at the time of making the reverse lower limit judgment is set to the low level. Thereafter, the process proceeds to step S440. In this embodiment, if the reverse lower limit flag is at the low level, it means that the seatbelt ECU 20 (more correctly, each of the pre-driver 24, driver circuit 21, current detecting circuit 25 and CPU 33 constituting the seatbelt ECU 20) is normal. On the other hand, if the reverse lower limit flag is at the high level, it means that there is the lower limit fault in the ECU 20 (more correctly, at least one of the pre-driver 24, driver circuit 21, current detecting circuit 25 and CPU 33 constituting the seatbelt ECU 20).

At step S440, it is determined whether or not the reverse current value $I_r$ is equal to or smaller than a predetermined second threshold. If the determination result at step S440 is affirmative, the process proceeds to step S450. The second threshold, which is obtained in advance by experiment for example, has a value twice the upper limit value of the current flowing through the motor 11 when the motor control signal (reverse control signal, or the normal control signal) having the initial duty ratio is applied to the driver circuit 21.

That is, step S440 enables making a judgment whether or not at least one of the pre-driver 24, driver circuit 21 current detecting circuit 25 and CPU 33 constituting the seatbelt ECU 20 has a fault which causes the current flowing through the motor 11 generating the driving force in the reverse direction to be higher than the upper limit value. In the following, this fault may be referred to as "upper limit fault", and this judgment may be referred to as "upper limit judgment". The upper limit fault includes a fault in which both of the reverse FETs 22B and 23B are locked abnormally, and a fault in which the amplification factor of the amplifier 25C increases abnormally.

At step S450, a reverse upper limit flag indicative of the state of the seatbelt ECU 20 at the time of making the reverse upper limit judgment is set to the low level. Thereafter, the process proceeds to step S480. On the other hand, if the determination result at step S440 is negative, the process proceeds to step S460 where the reverse upper limit flag is set to the high level, and then proceeds to step S480.

In this embodiment, if the reverse upper limit flag is at the low level, it means that the seatbelt ECU 20 (more correctly, each of the pre-driver 24, driver circuit 21, current detecting circuit 25 and CPU 33 constituting the seatbelt ECU 20) is normal. On the other hand, if the reverse upper limit flag is at the high level, it means that there is the reverse upper limit fault in the seatbelt ECU 20 (more correctly, at least one of the pre-driver 24, driver circuit 21, current detecting circuit 25 and CPU 33 constituting the seatbelt ECU 20).

If the determination result at step S420 is affirmative, that is, if there is the reverse lower limit fault in the seatbelt ECU 20, the process proceeds to step S470 to set the reverse lower limit flag to the high level, and then proceeds to step S480.

At step S480, a normal current value $I_n$, which is one of the indexes to judge the state of the seatbelt ECU 20, is calculated. Here, the normal current value $I_n$ is calculated as the sum of the first normal current value $I_{n1}$ and the second normal current value $I_{n2}$.

At subsequent step S490, it is determined whether or not the calculated normal current value $I_n$ is smaller than the predetermined first threshold. If the determination result at step S490 is negative, the process proceeds to step S500.

That is, step S490 enables making a judgment whether or not at least one of the pre-driver 24, driver circuit 21 current detecting circuit 25 and CPU 33 constituting the seatbelt ECU 20 has a fault which causes the current flowing through the motor 11 generating the driving force in the normal direction to be lower than the lower limit value. In the following, this fault may be referred to as "normal lower limit fault", and this judgment may be referred to as "normal lower limit judgment". The lower limit fault includes a fault in which at least one of the normal FETs 22A and 23A cannot be turned on.

At step S500, a normal lower limit flag indicative of the state of the seatbelt ECU 20 at the time of making the normal lower limit judgment is set to the low level. Thereafter, the process proceeds to step S510. In this embodiment, if the normal lower limit flag is at the low level, it means that the seatbelt ECU 20 (more correctly, each of the pre-driver 24, driver circuit 21, current detecting circuit 25 and the CPU 33 constituting the seatbelt ECU 20) is normal. On the other hand, if the normal lower limit flag is at the high level, it means that there is the normal lower limit fault in the ECU 20 (more correctly, at least one of the pre-driver 24, driver circuit 21, current detecting circuit 25 and CPU 33 constituting the seatbelt ECU 20).

At step S510, it is determined whether or not the normal current value $I_n$ is equal to or smaller than the predetermined second threshold. If the determination result at step S510 is affirmative, the process proceeds to step S520.

That is, step S510 enables making a judgment whether or not at least one of the pre-driver 24, driver circuit 21, current detecting circuit 25 and CPU 33 constituting the seatbelt ECU 20 has a fault which causes the current flowing through the motor 11 generating the driving force in the normal direction to be higher than the upper limit value. In the following, this fault may be referred to as "normal upper limit fault", and this judgment may be referred to as "normal upper limit judgment". The normal upper limit fault includes a fault in which both of the normal FETs 22A and 23A are locked abnormally, and a fault in which the amplification factor of the amplifier 25C increases abnormally.

At step S520, a normal upper limit flag indicative of the state of the seatbelt ECU 20 at the time of making the normal upper limit judgment is set to the low level. Thereafter, the process proceeds to step S550. On the other hand, if the determination result at step S510 is negative, the process proceeds to step S530 where the normal upper limit flag is set to the high level, and then the process proceeds to step S550.

In this embodiment, if the normal upper limit flag is at the low level, it means that the seatbelt ECU 20 (more correctly, each of the pre-driver 24, driver circuit 21, current detecting circuit 25 and CPU 33 constituting the seatbelt ECU 20) is normal. On the other hand, if the normal upper limit flag is at the high level, it means that there is the normal upper limit fault in the ECU 20 (more correctly, at least one of the pre-driver 24, driver circuit 21, current detecting circuit 25 and CPU 33 constituting the seatbelt ECU 20).

If the determination result at step S490 is affirmative, that is, if there is the normal lower limit fault in the ECU 20, the process proceeds to step S540 to set the normal lower limit flag to the high level, and then proceeds to step S550.

At step S550, it is determined whether or not at least one of the reverse lower limit flag, reverse upper limit flag, normal lower limit flag and normal upper limit flag is at the high level. If the determination result at step S550 is negative, since it means that all of the pre-driver 24, driver circuit 21, current detecting circuit 25 and CPU 33 constituting the seatbelt ECU 20 can normally operate, a return to the self-diagnostic process is made. Thereafter, when the self-diagnostic process is completed, a motor control process is activated.

On the other hand, if the determination result at step S550 is affirmative, since it means that there is a fault in at least one of the pre-driver 24, driver circuit 21, current detecting circuit 25 and CPU 33 constituting the seatbelt ECU 20, the process proceeds to step S560.

At step S560, activation of the motor control process is inhibited, and an indication is made to inform the passengers of the own vehicle that there is a fault in the seatbelt control device. This indication may be made by lighting a light (an LED for example) installed in a mater panel, or displaying letters, characters or symbols in a multi-information display mounted on the own vehicle. Or it may be a combination of them.

Thereafter, a return to the self-diagnostic process is made to complete the self-diagnostic process. As explained above, the self-diagnostic process causes the motor 11 to actually rotate in the reverse direction so that the first member is moved back to the initial position to break the engagement between the first and second members (that is, to disengage the clutch 14). Subsequently, the self-diagnostic process causes the motor 11 to actually rotate in the normal direction for a time shorter than the time needed for the first member located at the initial position to move and engage with the second member, and determines whether the normal FETs 22A and 23A, reverse FETs 22B and 23B, and current detecting circuit 25 are normal or abnormal on the basis of the current value detected while the motor 11 is being driven to rotate.

Figure 5:
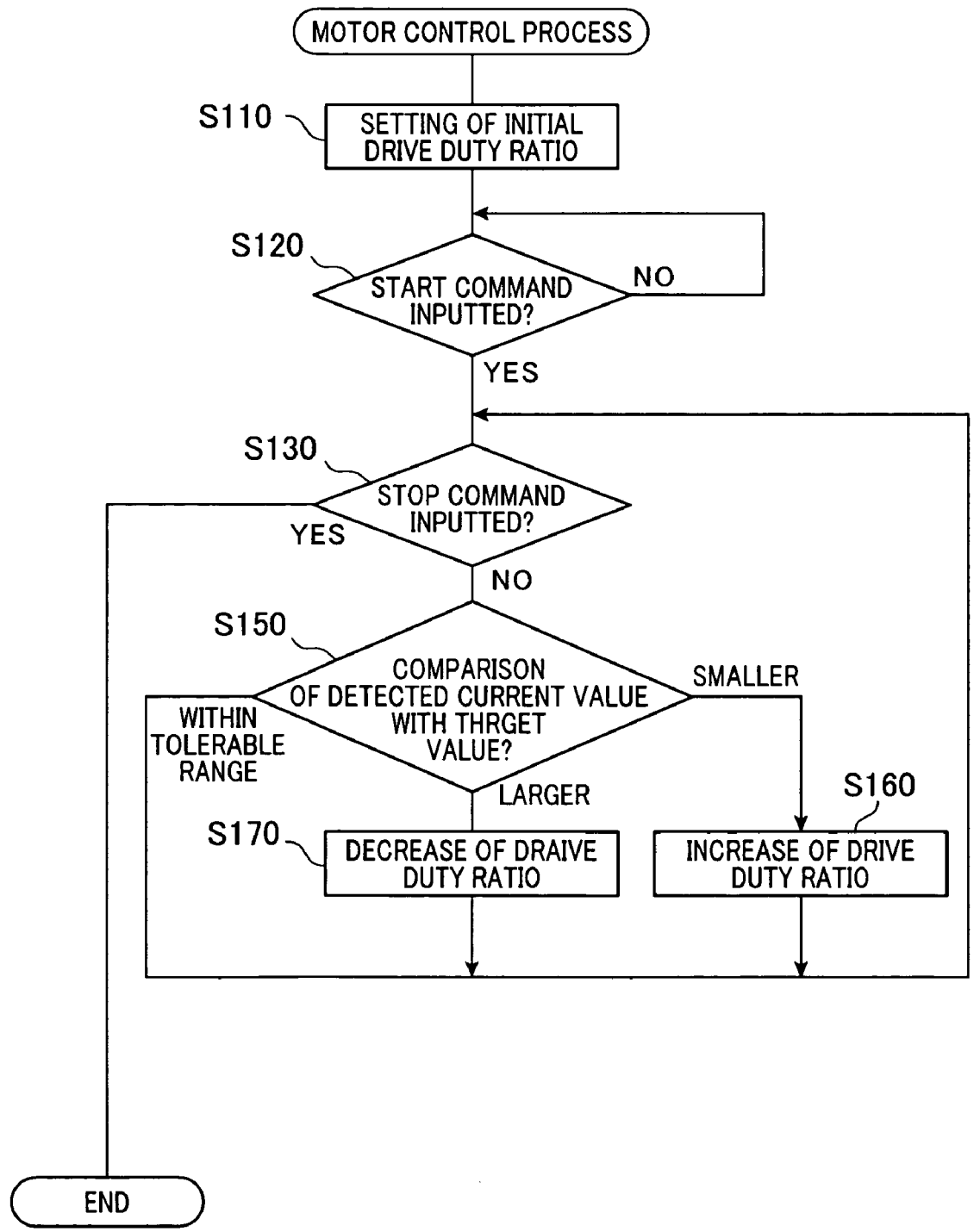
FIG. 5 is a flowchart showing a motor control process performed by the seatbelt control apparatus.

Hence, since the motor 11 is driven to generate the driving force in the normal direction only during the specific time, the motor 11 is stopped before the first and second members engage with each other to turn the spool 13. Next, the motor control process performed by the CPU 33 is explained with reference to the flowchart of FIG. 5.

The motor control process is activated when the self-diagnostic process is completed after the self-diagnostic process (more correctly, the fault judging process) determines that the seatbelt ECU 20 is normal.

The motor control process begins by setting the duty ratio (may be referred to as "drive duty ratio" hereinafter) of each of the normal control signal and the reverse control signal to the initial duty ratio at step S110.

At subsequent step S120, it is determined whether or not a start command has been inputted from the pre-crash ECU 6. The process waits until the determination result at step S120 becomes affirmative. When the determination result at step S120 becomes affirmative, the normal control signal having the initial duty ratio starts to be outputted.

At subsequent step S130, it is determined whether or not a stop command designating stop of outputting the normal control signal has been inputted. If the determination result at step S150 is negative, the process proceeds to step S150. At step S150, the detected current value is read in from the current detecting circuit 25, and it is determined whether the detected current value is smaller than or larger than a predetermined target value. If it is determined to be smaller than the target value, the process proceeds to step S160 where the drive duty ratio is increased, and then returns to step S130. On the other hand, if it is determined to be larger than the target value, the process proceeds to step S170 where the drive duty ratio is decreased, and then returns to step S130. More correctly, if it is determined at step S150 that the difference between the detected current value and the target value is within a predetermined range, the process returns to step S130 without changing the drive duty ratio.

If the determination result at step S130 is affirmative, the motor control process is terminated. As explained above, the motor control process performs a PWM control on the duty ratio (pulse width) of the normal or reverse control signal by repeating steps S150 to S170 in order that the detected current value corresponding to the torque generated by the motor 11 outputted from the current detecting circuit 25 is kept at the predetermined target value.

However, it should be noticed that if the determination result at step S120 is affirmative, the PWM control is performed (steps S150 to S170) on the normal control signal for a first predetermined time period, and after the elapse of the first time period, the PWM control is stopped to stop the motor 11 until a second time period set depending on the sate of the vehicle elapses. After the elapse of the second time period, the PWM control is performed (steps S150 to S170) on the normal control signal for a predetermined third time period, and after the elapse of the third time period, the PWM control is performed (steps S150 to S170) on the reverse control signal until a predetermined fourth time period elapses.

The above described embodiment of the invention provides the following advantages.

As explained above, the motor 11 actually generates the driving force in the normal direction when the self-diagnostic process is performed only during the specific time in which the spool 13 is not turned to wind the webbing 12.

Accordingly, according to this embodiment, it is possible to prevent the passenger of the own vehicle from having a feeling of concern when the self-diagnostic process is performed in which the tension of the webbing 12 is increased, and also to check the power supply path and the signal path necessary to drive the motor 11.

Furthermore, since the above embodiment does not need any additional circuit dedicated to input false signals from the microcomputer to the driver circuit and the current detecting circuit, it is possible to suppress increase of size and cost of the seatbelt ECU 20, and also to prevent making a misjudgment that there is a fault in the components to be inspected although actually the fault is in the additional circuit.

In this embodiment, if the driver circuit 21 and the current detecting circuit 25 are normal, the motor control process is activated immediately after completion of the self-diagnostic process. This makes it possible that even when the start command is inputted to the seatbelt ECU 20 during execution or immediately after completion of the self-diagnostic process, the time elapsed from when the stat command is inputted to when the tension of the webbing 12 is increased can be shortened compared to the conventional seatbelt ECUs. It is a matter of course that various modifications can be made to the above described embodiment as described below.

As explained in the foregoing, the self-diagnostic process proceeds such that the motor 11 is driven in the reverse direction to acquire the first and second reverse current values at steps S210 to S260, followed by being driven in the normal direction to acquire the first and second normal current values at steps S270 to S320, and the fault judging process is performed to make a judgment as to the state of the seatbelt ECU 20 on the basis of the reverse current value (referred to as "reverse judgment" hereinafter") at step S410 to step S470, and then make a judgment as to the state of the seatbelt ECU 20 on the basis of the normal current value (referred to as normal judgment "hereinafter") at step S480 to step S540.

However, the self-diagnostic process in the above embodiment may be modified to proceed such that the motor 11 is driven in the reverse direction to acquire the first and second reverse current values at steps S210 to S260, and thereafter the fault judging process is performed to make a judgment as to the state of the seatbelt ECU 20 on the basis of the reverse current value at step S410 to step S470. In this modification, if it is judged that there is a fault in the seatbelt ECU 20 at step S550, the subsequent steps are inhibited, and the motor control process is inhibited, while if it is judged that the seatbelt ECU 20 is normal, the motor 11 is driven in the normal direction to acquire the first and second normal current values at steps S270 to S320, and then a judgment as to the state of the seatbelt ECU 20 is made on the basis of the normal current value at steps S540 to S590. Subsequently, if it is judged at step S550 that there is a fault in the seatbelt ECU 20, the motor control process is inhibited.

According to the self-diagnostic process which proceeds as described above, it is possible to detect a fault in the seatbelt ECU 20 at a time as early as when the motor 11 is driven in the reverse direction, and to safely perform the control of the seatbelt because the subsequent steps and the motor control process are inhibited if a fault is detected in the seatbelt ECU 20.

The self-diagnostic process of the above embodiment operates to output the reverse control signal before outputting the normal control signal to move the first member of the clutch 14 back to the initial position. However, the self-diagnostic process may be modified to operate to output the normal control signal without outputting the reverse control signal.

The self-diagnostic process (more correctly, the fault judging process) of the above embodiment uses, as the reverse current value $I_r$ (or the normal current value $I_n$), the sum of the first and second reverse current values $I_{r1}$ and $I_{r2}$ (or the first and second normal current values $I_{n1}$ and $I_{n2}$). However, the self-diagnostic process may be modified to use only one of the first and second reverse current values $I_{r1}$ and $I_{r2}$ (or only one of the first and second normal current values $I_{n1}$ and $I_{n2}$), or an average of them.

It is needless to say that the first and second thresholds need to be determined differently for these cases.

In the above embodiment, the self-diagnostic process is activated only when the seatbelt ECU 20 is activated. However, the self-diagnostic process may be activated at predetermined time intervals. However, in this case, since the motor control process has to be activated at the predetermined time intervals as well, it is desirable that the self-diagnostic process is performed immediately before performing the motor control process. By performing the self-diagnostic process as such timings, it becomes possible to make a judgment whether the seatbelt ECU 20 is normal or not at any time while the seatbelt ECU 20 is being activated.

In the above embodiment, the pre-driver circuit 24 inhibits outputting the motor control signal to the driver circuit 21 in response to the drive stop signal to thereby stop the motor 11 when an overcurrent is detected by the overcurrent detecting circuit 26. However, the embodiment may be modified such that the CPU 33 itself stops outputting the motor control signal.

In this case, the drive stop signal needs to be inputted to the CPU 33 instead of the pre-driver circuit 24. Although the seatbelt ECU 20 of the above embodiment is constituted mainly by the microcomputer, it may be constituted by a logic circuit which provides the same functions as those provided by the microcomputer performing the self-diagnostic process or the motor control process.

Although the driver circuit 21 of the above embodiment is of the H-bridge circuit type constituted by the four N-channel FETs, it may be of a bridge circuit type other than the H-bridge circuit type, or it may be constituted by a single FET. In short, any circuit can be used as the driver circuit 21, if it is capable of controlling energization of the motor 11.

Although the current detecting circuit 25 of the above embodiment is constituted by the shunt resistor 25A, amplifier 25C and A/D converter 25B, a sense MOS may be used instead of the shunt resistor 25A.

Although the pre-crash safety system 1 is configured to drive the brake control device 7 if the collision probability is higher than the first threshold, it may be modified to wind the seatbelt by a predetermined amount to notice the passenger of the own vehicle of the high probability of collision in such an occasion.

Although the pre-crash ECU 6 outputs the start command in the above embodiment, the start command may be outputted from the forward-monitoring device 5. In other words, the function of the pre-crash ECU 6 may be included in the forward-monitoring device 5. Further, the start command may be outputted from other device of the system other than the pre-crash ECU 6 and the forward-monitoring device 5. Also, the start command may be generated in the seatbelt ECU 20.

Although the above embodiment is applied to the pre-crash safety system to control the driving state of the motor 11 of the seatbelt winding device 10 included in the pre-crash safety system, it may be applied to a power steering system to control a motor thereof, or a power window device to control a motor thereof.

The above explained preferred embodiments are exemplary of the invention of the present application which is described solely by the claims appended below. It should be understood that modifications of the preferred embodiments may be made as would occur to one of skill in the art.

What is claimed is:

1. A motor driving device for controlling a driving state of a motor of a driven device having a driven member and a clutch, said clutch including a first member configured to move when applied with a driving force in a first direction or a second direction opposite to said first direction generated by said motor, a second member which transmits said driving force to said driven member while said first member engages with said second member, said clutch being configured such that a first time period elapses from a time at which said driving force in said first direction is applied to said first member located at an initial position thereof to a time at which said first member engages with said second member, said motor driving device comprising:
- a first function of supplying power to said motor so that said motor generates said driving force;
- a second function of detecting a current flowing through said motor supplied with power by said first function;
- a third function of performing a power supply control in order that a value of said current detected by said second function is maintained within a target range;
- a fourth function of performing a first power supply operation in which said motor is supplied with power for a second time period shorter than said first time period such that said motor generates said driving force in said first direction before said third function performs said power supply control; and
- a fifth function of making a judgment on a state of each of said first to third functions on the basis of said value of said current detected by said second function during said second time period.

2. The motor driving device according to claim 1, wherein said fifth function is configured to judge that at least one of said first to third function has a fault if said value is outside a tolerable range of said current to be detected by said second function during said second time period.

3. The motor driving device according to claim 1, wherein said clutch is configured such that when said first member is applied with said driving force in said second direction, said first member disengages from said second direction and moves back to said initial position, and said motor driving device further comprises a sixth function of performing a second power supply operation in which said motor is supplied with power such that said motor generates said driving force in said second direction before said fourth function performs said first power supply operation.

4. The motor driving device according to claim 1, wherein said driven member is a spool on which a webbing is wound.

5. A method of making a judgment on a state of a motor driving device for controlling a driving state of a motor of a driven device having a driven member and a clutch,
- said clutch including a first member configured to move when applied with a driving force in a first direction or a second direction opposite to said first direction generated by said motor, a second member which transmits said driving force to said driven member while said first member engages with said second member, said clutch being configured such that a first time period elapses from a time at which said driving force in said first direction is applied to said first member located at an initial position thereof to a time at which said first member engages with said second member,
- said motor driving device including a first function of supplying power to said motor so that said motor generates said driving force, a second function of detecting a current flowing through said motor supplied with power by said first function, and a third function of performing a power supply control in order that a value of said current value detected by said second function is maintained within a target range;
- said method comprising the steps of:
- performing a first power supply operation in which said motor is supplied with power for a second time period shorter than said first time period such that said motor generates said driving force in said first direction before said third function performs said power supply control; and
- making a judgment on a state of each of said first to third functions on the basis of said value of said current detected by said second function during said second time period.

* * * * *